United States Patent [19]
Mayer et al.

[11] 3,968,969
[45] July 13, 1976

[54] SEALING ARRANGEMENT

[76] Inventors: Ehrhard Mayer, Birkenallee 13, D-8191 Eurasburg; Ludwig Findler, Margeritenstrasse 30, D-8190 Wolfratshausen; Wolfgang Mathes, Geiselgasteigstr. 96, D-8000 Munich 90; Michael Steigenberger, Hauptstr. 25, D-8191 Eurasburg, all of Germany

[22] Filed: Feb. 26, 1975

[21] Appl. No.: 553,295

[30] Foreign Application Priority Data
Mar. 1, 1974 Germany............................ 2409954

[52] U.S. Cl................................. 277/15; 277/69; 277/67; 277/74
[51] Int. Cl.² ........................................ F16J 15/34
[58] Field of Search ................... 277/15, 68, 74, 69, 277/3, 67

[56] References Cited
UNITED STATES PATENTS

| | | |
|---|---|---|
| 3,580,587 | 5/1971 | Born et al. .............................. 277/3 |
| 3,746,350 | 7/1973 | Mayer et al............................ 277/15 |
| 3,843,140 | 10/1974 | Mayer et al............................ 277/15 |

Primary Examiner—Samuel B. Rothberg
Attorney, Agent, or Firm—Jerry Cohen; Charles Hieken

[57] ABSTRACT

In a mechanical seal with rubbing slide ring and counter ring elements, an annular distributor guiding element which defines the annular channel guiding coolant and lubricating liquid to the interface between the elements is axially displaceable between limiting stops. The distributor guiding element tapers inwardly to define an inner orifice closely surrounding one of said ring elements or a ring form holder therefore to define an annular passage which constitutes a liquid flow regulating area.

13 Claims, 3 Drawing Figures

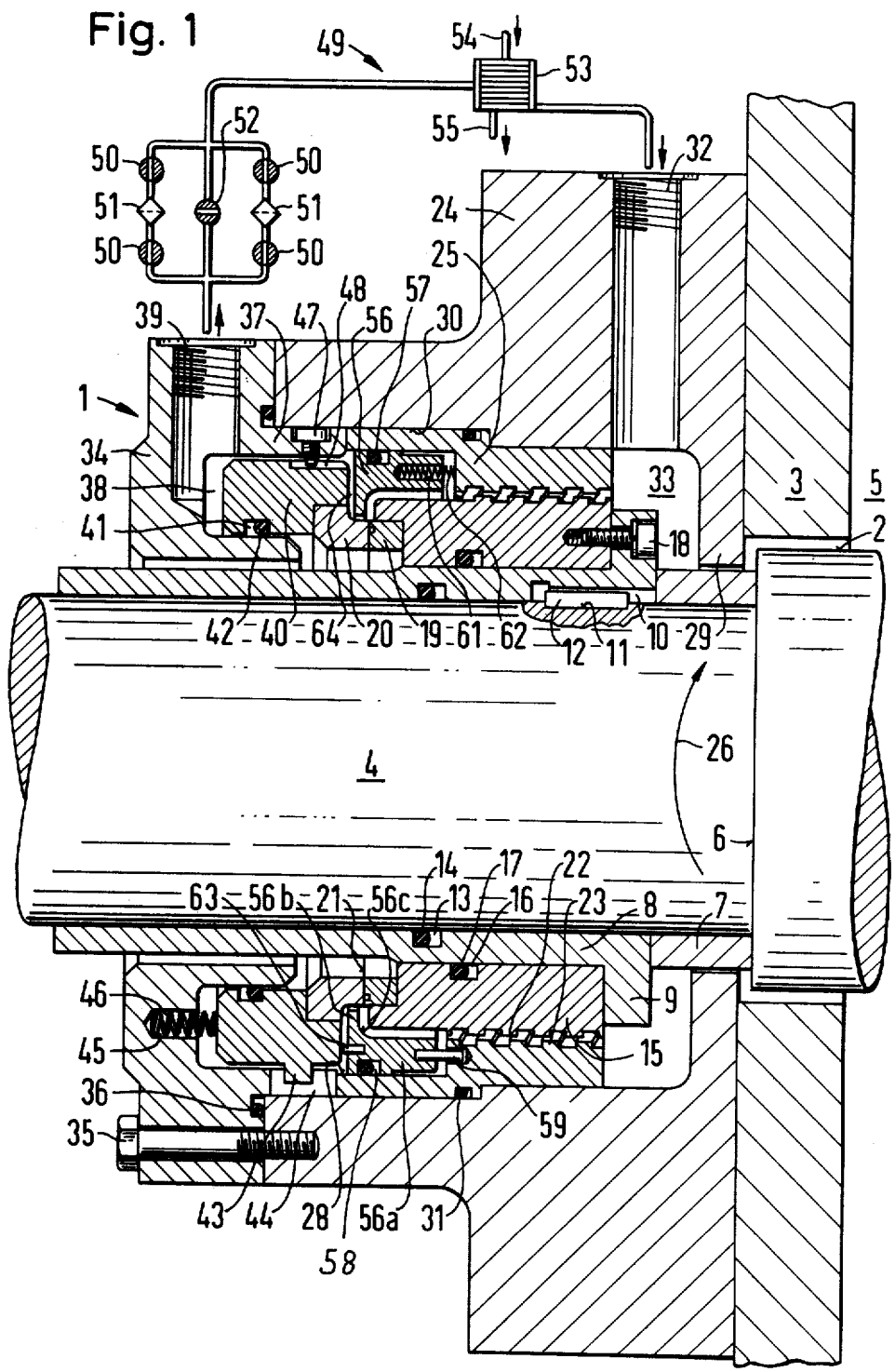

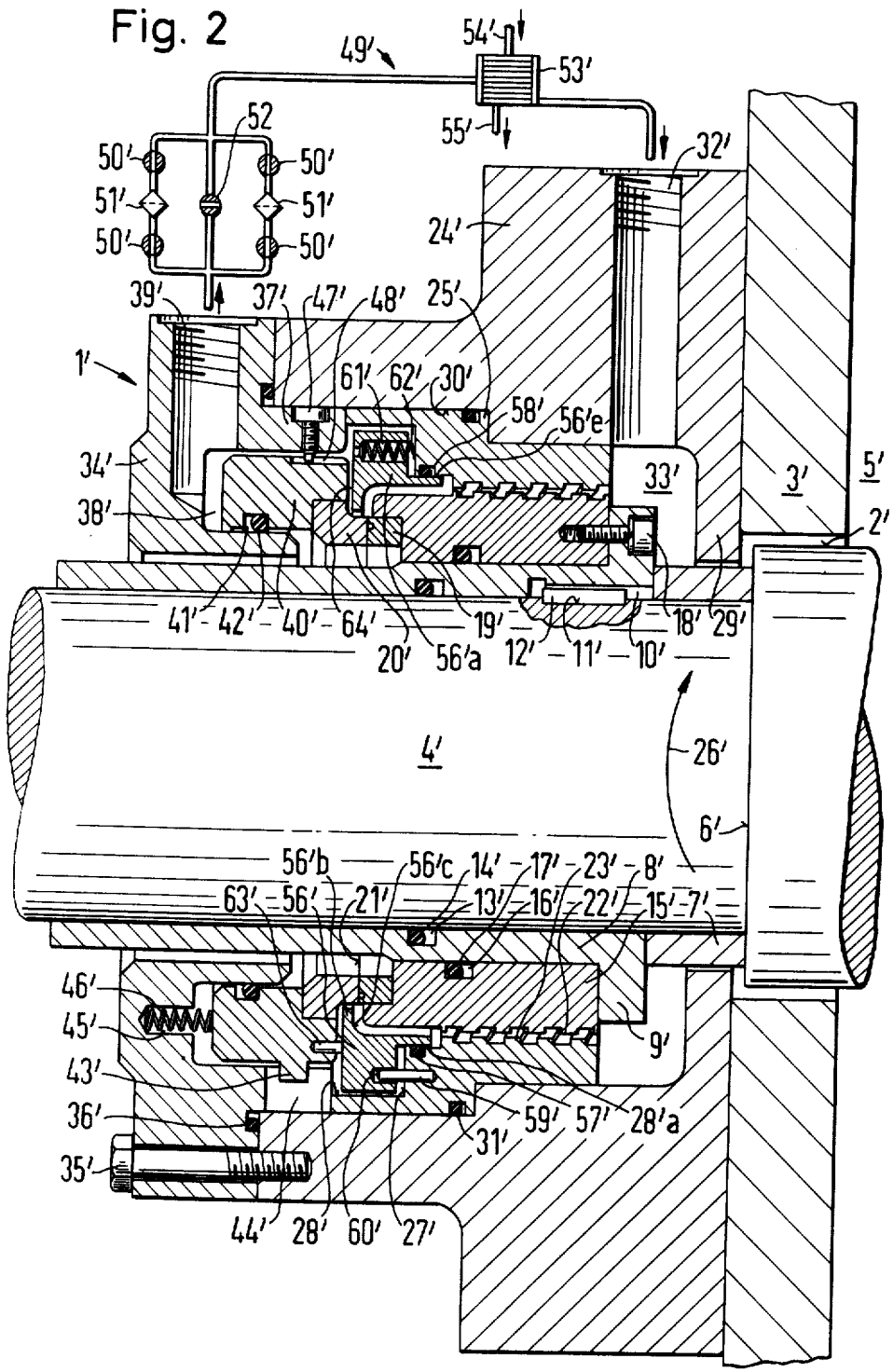

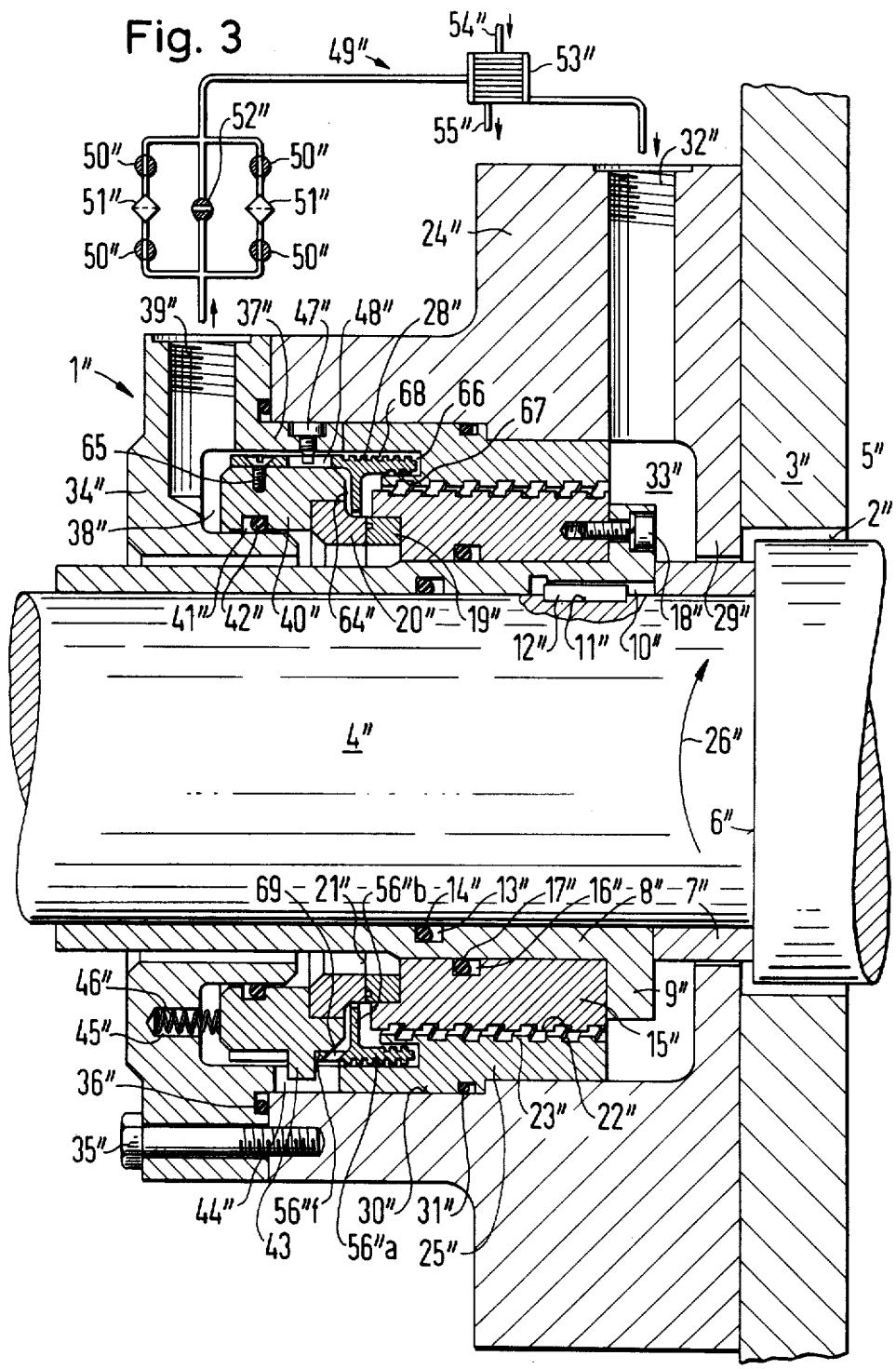

SEALING ARRANGEMENT

BACKGROUND OF THE INVENTION

The present invention relates generally to shaft seals and more particularly to mechanical seal assemblies of the type comprising a fixed seal housing surrounding a rotating shaft and further comprising opposed slide ring and counter ring elements one of which is attached to the shaft and the other of which is attached to the fixed housing. The ring elements rub against each other at an interface and an annular distributor guiding element defines a channel within the seal housing through which cooling and lubricating liquid is directed at said interface.

A screw type pump within the housing circulates liquid to the distributor from a seal housing inlet and increases the pressure of said liquid. After contacting the periphery of said interface, the liquid continues through an outlet channel of the housing to an exit and may be recirculated to said inlet via an external heat exchanger. The screw pump may comprise opposed cylindrical threaded surface with screw threads of opposite hand thereon, one of said surface being (for instance) an inwardly facing surface with a right hand thread affixed to the seal housing and the other surface being an outwardly facing surface with a left hand thread affixed to the rotating shaft. The two threaded surfaces are closely spaced but noncontacting.

At high and maximum circumferential speed there is the further requirement to attach the counter ring rigidly to the shaft while the axially displaceable and elastically prestressed slide ring is carried by the sealing housing which slide ring then must absorb an axial play of the shaft of, e.g., ± 3 millimeters and also the abrasion of the ring caused by wear. In such arrangement of the rings, the slide ring supported nonrotatably in the sealing housing must under normal operating conditions be able to execute axial motions with a travel of, e.g., 6 millimeters, which must not be hindered by the distributor guiding element connected rigidly to the sealing housing. But this implies that the distributor guiding element cannot be arranged in an optimal spatial configuration with respect to the stationary slide ring for all operating conditions and also must have such a large play with respect to the latter that the flushing out of the hot water-ring is prevented. This ring of hot coolant mixed with steam bubbles having a relatively low volume weight is formed by the influence of centrifugal forces urging cold coolant of higher volume weight radially outward to the sealing casing. In order to nevertheless achieve an adequate heat dissipation, it was necessary heretofore to increase considerably the amount of coolant conveyed in the circuit, e.g., up to values of 100 liters per minute. But a considerable power of 10 kilowatts, for example, must then be utilized to drive the pump mechanism. Apart from this undesirable waste of energy to drive the pump mechanism, this energy heating the coolant must again be removed from the coolant circuit by the heat exchanger with increased demand for cooling water. Beyond this, the dimensions of the coolant circuit are increased due to the increased volume of circulated coolant.

The object of invention is to create a mechanical sealing arrangement which at high and maximum circumferential speeds permits a reliable cooling.

It is a further object of the invention that the sealing arrangement be economical with respect to the energy demand and construction expense consistent with the preceding object.

SUMMARY OF THE INVENTION

Starting from a mechanical seal of the initially mentioned type, the above problems are solved according to the invention in that the distributor is supported displaceably in the axial direction and is guided at a constant axial separation from the slide ring arranged in the sealing housing nonrotatably and axially displaceable against springs.

On one hand, due to this development the distributor can be arranged relative to the slide ring in a position which is optimal for cooling and which is unchanged even when the shaft moves axially during operation, and, on the other hand, it is possible to bring the distributor so close to this slide ring that the heated coolant, permeated with bubbles of gas and steam or vapor, can be flushed out without having to tolerate any unfavorable increase in the amount of circulated coolant.

The distributor may be so arranged that it surrounds the circumference of the slide ring and together with the latter forms an annular gap of less than 4 millimeters, preferably 1.5 – 3 millimeters. Furthermore, the size of this annular gap is appropriately so determined to obtain a flow speed greater than 20 centimeters per second, preferably greater than 50 centimeters per second.

According to a first embodiment of the invention, the distributor being slidingly guided in a borehole formed in the sealing housing or a bush mounted therein, is prestressed by springs in the direction toward the slide ring (or a support ring holding the latter) and butts against extensions of the slide ring (or of its support ring.) The extensions are separator pieces or pins of such a length and arranged to provide an approximately radial channel between the slide ring and distributor which connects the said annular gap and an exit borehole in the sealing housing leading to an external heat exchanger.

In another embodiment, the distributor is fastened unmovably to the slide ring (or to a support ring holding the latter) so that there remains an approximately radial channel corresponding to the aforesaid embodiment. In this channel, whose flow cross-section remains unaltered, there results an additional effective cooling of the slide ring (or its support ring).

The annular gap formed between the distributor and the slide ring represents a considerable flow resistance, so that a pressure differential is generated between the two axial sides of the distributor. This pressure differential generates an axial force which acts on the distributor and whose magnitude depends on several factors, particularly the flow cross-section of the annular gap, the volume of liquid conducted through the annular gap and the position of the sealing elements.

As a further development of the invention, the axial force exerted on the distributor is utilized to influence the contact force with which the slide ring, under the action of its springs, is applied against the counter ring rotating with the shaft. For example, according to the invention it is possible to reduce the contact force with increasing amount of coolant conveyed through the sealing housing, which is particularly suitable when the pump mechanism is driven by the shaft and when therefore a reduction of the contact force and therewith a reduction of the frictional heat is to be achieved in the event that the rotational speed of the shaft is raised and therewith the delivery volume is raised. In another instance it may be desirable to reduce the high contact force that results when a large volume of coolant is carried through and therewith reduce the frictional heat, if the volume of coolant decreases.

These and other objects, features and advantages of the invention will be apparent from the following description of preferred embodiments taken in connection with the accompanying drawing, in which:

BRIEF DESCRIPTION OF THE DRAWING

FIGS. 1, 2 and 3 are cross-section views of three preferred embodiments of the invention, respectively.

DETAILED DESCRIPTION OF PREFERRED EMBODIMENTS

Referring now to FIG. 1 there is shown a slide ring type sealing assembly 1 in accordance with a preferred embodiment of the invention operating in connection with a bore 2 in a wall 3. A shaft 4 passes through the bore 2 into the interior of a chamber 5 defined, at least in part, by wall 3 wherein a fluid is sealed despite the break in wall 3 for bore 2 and rotating shaft 4 which passes therethrough.

A first short length cylindrical shaft sleeve 7 abutting against a collar 6 and a second long length cylindrical shaft sleeve 8, carrying a flange 9, surround the shaft 4. Corresponding recesses 10 and 11 in shaft sleeve 8 and shaft 4, respectively, and a key 12 therebetween prevent relative rotation between them so that the shaft sleeve rotate together with shaft 4. An O-ring gasket 14 is contained in a circular recess 13 on the interior of shaft sleeve 8 and bears against shaft 4.

There is also shown on the second shaft sleeve 8, a carrier ring 15, with an interior circular recess 16 containing an O-ring gasket 17, which is secured to the second shaft sleeve 8 by a plurality of bolts passing through flange 9, one of which is indicated at 18. The carrier ring 15 carries a cylindrical counter ring number 19 which bears against a slide ring 20, supported in a manner described below, and defines a sealing interface 21 therebetween.

The slide ring assembly 1 further comprises a main housing 24 demountably securable to the wall 3 by bolts or other means, (not shown) and containing an orifice of diameter smaller than bore 2 of wall 3 for close fitting, but noncontacting, passage of the first shaft sleeve 7 therein. The above described carrier ring 15 has an external spirally threaded surface 22 and the seal housing 24 carries an interior bushing 25 therein which has interior spirally threaded surface 23 working together with the thread 22 to define a fluid pump, the particular construction of such cooperating threaded surfaces being as described in U.S. Pat. No. 3,746,350 or U.S. patent applicaton Ser. No. 308,006, filed Nov. 20, 1972 but preferably constructed more specifically as described below.

The pump defined by threads 22 and 23 feeds cooling medium to the outer periphery of the interface 21 between the slide ring and counter ring via an inwardly converging guide channel which is completely annular and defined in part by a rounded corner of the carrier ring 15 opposing an inwardly converging curved distributor guide member 56, described below. The bushing 25 is secured in the seal housing and with it to the wall 3 as a fixed member. An inner portion of housing 24 comprises a spring flange element 29 which has a small bore clearing the first shaft sleeve 7 with a narrow radial play. The seal housing further has a bore 30 accommodating the bushing 25 with O-ring gasket 31 therebetween. The seal housing has an inlet bore 32 for receiving cooling medium which terminates in a ring form chamber 33 defined between the spring flange end 29 and the above-described parts 15 and 25 and constitutes an entrance to the cylindrical pump defined by the threaded surfaces 22 and 23 of said parts.

Seal housing 24 has a cover 34 closing off and entering into the bore 30 and having an internal cylindrical extension clearing the second sleeve 8 with narrow radial play. A plurality of bolts, one of which is shown at 35 secure the cover to the seal housing 24 in fixed relation. An O-ring gasket 36 between seal housing 24 and cover 34 thereof prevents leakage therebetween. An outer ring extension 37 of the cover 34 extends within bore 30 and defines the exterior of an exit chamber 38 of ring-form which has an outlet bore 39 leading therefrom to the exterior of the cover 34. A carrier ring 40 is mounted on the cover 34 and has a recess 41 containing an O-ring gasket 42 for sealing the interface therebetween and a key 43 and swap 44 on ring 40 and cover 34 respectively or vice versa on extension 37 of cover 34, respectively, or vice versa, and prevents relative rotation therebetween so that a ring 20 carried by carrier ring 40 is secured against rotation, and, in effect, fixed to the seal housing 24.

Annularly arrayed around cover 34 are holes 45 containing springs 46 which bear against carrier ring 40 to urge ring 20 resiliently against ring 19. A peg 47 passes through the extension 37 of cover 34 to engage carrier ring 34 and through its frictional engagement therewith, preferably in a clot 48 thereof, limits the effect of springs 46 and also as a stop to displacement of ring 40 by string 46 through engagement with the back end wall of slot 48 or equivalent means.

The outlet bore 39 leads to a recirculating heat exchange loop 49 which returns to the inlet passage 32 of the seal housing after the passage, conducted by selective operation of valves 50 or 52 through filters 51 and heat exchanger 53, which also has passages for inlet (54) and outlet (55) of heat exchange fluid.

The critical point of flow through the loop is the proper supply of cooling fluid to the interface 21 between the slide ring and counter ring and the converging passage thereto is defined by an inwardly converging curved distributor guide member 56 which comprises a smooth entrance section 56a and a radially inwardly extending end 56b joined by a smoothly curved concave shoulder portion 56c. The member 56 is sealed within holder ring 25, which carries it, by an O-ring gasket 57 held in an annular recess 58.

Annularly arrayed around the front end (extending towards space 5) of the tube forming part 56a are pegs 59 and coil springs 62 supported in holes in part 56a (holes 61 contouning the springs 62) and extending to an inner shoulder 27 of bushing 25. Similar pegs 63, in an annular array, extend from carrier ring 40 to distributor 56. Springs 46 in holes 45 of cover 34 extend carrier ring 40. A small annular radial channel of 1,5–3 millimeters on radius is defined in the space between the inner edge of part 56b and the outside of slide ring 20. Cooling water guided to the sealing interface of rings 19, 20 by distributor 56 passes through this channel and up through a radial annular channel 64 defined between distributor 56 and the forward face of ring 40 with a minimum axial span of such channel established by pegs 63. The water can then pass out through manifold 38 and bore 39 to the external heat exchanger described above.

A flow of over 50 cm/sec. through channel 64 is established by the pressure head of pumped water and the small size of the annulus between 56b and 20. The resistance to flow up channel 64 at such speed is such that there is a lower pressure on the back side than on the front side of distributor 56. This together with the action of springs 62 and 46 tends to float distributor 56 against pegs 63. However under some transient conditions of flow, the fluid distributor 56 will float towards bushing 25 and pegs 59 set definite limits to such movement. In this arrangement distributor 56 is tolerant of axial excursion of shaft 4 and nevertheless maintains optimum position.

Changing pressure in channel 64 can also force carrier ring 40 back against springs 46 to define the sealing force that slide ring 20 (carried by ring 40) exerts against counter ring 19 at sealing interface 21. For instance when the speed of shaft 4 increases, the pump defined by threads 23 and 24 delivers more fluid and this develops a pressure easing ring 40 back against the action of springs 46 to reduce the sealing force at interface 21. This effects a desirable reduction in frictional heat generated at interface 21.

In the FIG. 2 and 3 embodiments, parts similar to those of the FIG. 1 embodiment are indicated by the same reference numerals MTL one and two prime symbols added, respectively, and reference may be had to the discussion of FIG. 1 above for a description of such parts.

The differences are as follows:

The bushing 25' (which carries the internal threaded surface 23) in FIG. 2 differs from the bushing 25 of FIG. 1 by providing a larger bore therein indicated at 28' allowing a larger distributor element 56' which creates a greater radius for the radial space 64'. The distributor element 56' has a tubular extension 56'd terminating in a circumferential wall 56'e which mates with a bore 28'a and the seal therebetween is completed by an O-ring gasket 57' in a groove 58' in bore 28'a. It will be noted that the sealing interface defined at 56'a/28'a in FIG. 2 is at a location of reduced diameter compared to the corresponding sealing interface between bore 28 and distributor 56 in FIG. 1.

The FIG. 1 embodiment allows a greater axial force to be applied to the distributor 56 than the FIG. 2 embodiment allows for distributor 56' because the available working surface of the latter exposed to the pressurized working fluid at the outlet of the screw thread pump.

In the further embodiment of FIG. 3, a modified distributor 56'' has tubular extension 56''f to the left of the central apertured disc 56''b as well as a tubular extension to the right, 56''a. Holder ring 40'' has a reduced outer diameter (compared to 40 and 40' of the FIGS. 1 and 2 embodiments) to accommodate tube 56''f. Bolt 47'' extending into a groove 48'' and one or more screws 65 connecting tube 56''f to ring 40'' prevent rotation of the ring 40''/distributor 56'' subassembly.

A shoulder 27'' on bushing 25'' forms an annular space 66 and annular internal grooves 67 and external grooves 28'' on tubular extension 56''a form a throttle bypass path for pressurized fluid working around distributor 56'' rather than passing through the radial slit between 56''b and slide ring 20'' and through chamber 64''.

It is evident that those skilled in the art, once given the benefit of the foregoing disclosure may now make numerous other uses and modifications of, and departures from the specific embodiments described herein without departing from the invention concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Mechanical seal assembly for an axially extending elongated shaft comprising,
   means defining an annular slide ring seal with rubbing slide ring and counter ring elements,
   means defining a housing containing said seal and rotationally fixedly mounting said slide ring,
   said counter ring being mountable on said shaft via counter ring support structure,
   means defining a coolant circuit that conducts a coolant through the seal housing in an axial direction and including a pump device with inlet and outlet ends for pumping coolant liquid through the circuit, which circuit further comprises an annular space surrounding said seal and distributor guiding means that conduct the coolant to an edge of the sealing interface of the slide ring and counter ring within said annular space and which are sealed with respect to the seal housing,
   and further comprising means for supporting and displacing the distributor guiding means in said axial direction and constructed and arranged to maintain the distributor guiding means at a constant axial distance from the slide ring,
   the slide ring being mounted in the seal housing in a rotationally fixed manner and being axially displaceable against springs.

2. Mechanical seal assembly in accordance with claim 1 wherein the distributor guiding means comprises an annulus shape surrounding the slide ring and being closely spaced therefrom and also being downstream of the pump outlet and wherein the radial inside width of the radial annular gap formed between the distributor guiding means and the periphery of the slide ring is of such a size in relation to the pump device that the flow speed of the coolant is greater than 20 centimeters per second.

3. Mechanical seal assembly as claimed in claim 2, wherein the annular gap formed between the distributor guiding means and the outer periphery of the slide ring has a radial inside width of less than 4 millimeters.

4. Mechanical seal assembly in accordance with claim 2 and further comprising means defining an axially extending bore within said annular space
   and wherein the distributor guiding means are slidingly guided in said bore and are prestressed in a direction toward the slide ring,
   and means defining butting engagement of the distributor guiding means against the slide ring support structure via spacing pieces in such a manner that there remains a radial channel between the support structure and distributor which is joined to said annular gap and which is connected to an exit in the seal housing.

5. Mechanical seal assembly in accordance with claim 2 wherein the distributor guiding means are fastened immovably to the slide ring structure and define therewith a radial channel for radial outward movement of coolant from the seal which is joined to said annular gap and which is connected to an exit of the seal housing.

6. Mechanical seal assembly in accordance with claim 5 wherein the diameter of the peripheral surface acting to seal off the distributor guiding means with respect to the seal housing defines the outer end of said radial channel and is chosen in accordance with the degree of a desired influence of the bearing force of the slide ring against the counter ring as a function of the volume of the coolant conducted past said annular gap, with the degree of the influence rising with increasing deviation of diameter from a mean diameter of the annular gap between the distributor guiding means and slide ring.

7. Mechanical seal assembly in accordance with claim 6 wherein a flow direction of the coolant from the counter ring to the slide ring is provided to influence the bearing force in the sense of a reduction and that an opposite flow direction is provided to influence it in the reverse sense.

8. Mechanical seal assembly in accordance with claim 1 wherein the pump device is formed as a screw-thread pump which is arranged inside the seal housing and comprising an outer thread and an inner thread of opposite hand surrounding it coaxially with slight radial play on opposing cylindrical surfaces, one of which is connected rigidly to the seal housing and the other of which rotates with a shaft to be sealed off by said seal and has a pitch direction opposite to the shaft rotation direction to reduce the bearing force of the counter ring with increasing rotation speed of the shaft.

9. Mechanical seal assembly in accordance with claim 1 wherein the pump device is formed as a screw thread pump which is arranged inside the seal housing and comprises an outer thread and an inner thread of opposite hand surrounding coaxially with slight radial play on opposing cylindrical surfaces one of which is connected rigidly to the seal housing and the other of which rotates with a shaft to be sealed off by said seal and has the same pitch direction as the shaft rotation direction to raise bearing force of the counter ring with increasing rotation speed of the shaft.

10. Mechanical seal assembly in accordance with claim 1 wherein the distributor guiding means consists essentially of a tubular part and a flangetype part directed radially inward from the latter.

11. Mechanical seal assembly in accordance with claim 10 wherein the tubular part of the distributor guiding means with an outer cylindrical peripheral surface is displaceably guided in a bore formed in a bushing in the seal housing, and that the seal of the distributor guiding means is arranged between this peripheral surface and the bore.

12. Mechanical seal assembly in accordance with claim 10 wherein a tubular part projects from each axial side of the flangetype part, that one tubular part is pushed onto the support ring of the slide ring and is sealingly fastened and adjacent to the flangetype part, is broken through by at least one slit, and that the other tubular part forms a contactless seal by entering with slight radial play into an annular space which is open in the axial direction and which is formed in the seal housing.

13. Mechanical seal assembly in accordance with claim 12 wherein unconnected annular grooves are cut into the inner and/or outer peripheral surface of the section of the tubular part entering into the annular space.

* * * * *